(12) United States Patent
Xie

(10) Patent No.: US 9,643,854 B2
(45) Date of Patent: May 9, 2017

(54) METHOD FOR MAKING MAZ FRAMEWORK TYPE ZEOLITES

(71) Applicant: Dan Xie, Richmond, CA (US)

(72) Inventor: Dan Xie, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 426 days.

(21) Appl. No.: 14/542,307

(22) Filed: Nov. 14, 2014

(65) Prior Publication Data

US 2016/0137519 A1   May 19, 2016

(51) Int. Cl.
*C01B 39/48* (2006.01)
*B01J 29/70* (2006.01)

(52) U.S. Cl.
CPC .......... *C01B 39/48* (2013.01); *B01J 29/7011* (2013.01)

(58) Field of Classification Search
CPC .............................. C01B 39/48; B01J 29/7011
See application file for complete search history.

(56) References Cited

U.S. PATENT DOCUMENTS

| | | | |
|---|---|---|---|
| 3,314,752 A * | 4/1967 | Kerr | C01B 33/2876 |
| | | | 423/705 |
| 3,853,743 A * | 12/1974 | Schwartz | B01J 20/186 |
| | | | 502/62 |
| 4,021,447 A | 5/1977 | Rubin et al. | |
| 4,241,036 A | 12/1980 | Flanigen et al. | |
| 4,331,643 A | 5/1982 | Rubin et al. | |
| 4,377,502 A | 3/1983 | Klotz | |
| 9,012,377 B2 * | 4/2015 | Khabashesku | C09K 8/524 |
| | | | 166/304 |

FOREIGN PATENT DOCUMENTS

GB      1117568      6/1968

OTHER PUBLICATIONS

A.J. Perrotta, C. Kibby, B.R. Mitchell and E.R. Tucci "The Synthesis, Characterization, and Catalytic Activity of Omega and ZSM-4 Zeolites" J. Catal. 1978, 55, 240-249.

A.M. Goossens E.J.P. Feijen, G. Verhoeven, B.H. Wouters, P.J. Grobet, P.A. Jacobs and J.A. Martens "Crystallization of MAZ-type zeolites using tetramethylammonium, sodium and n-hexane derivatives as structure- and composition-directing agents" Micropor. Mesopor. Mater. 2000, 35-36, 555-572.

* cited by examiner

*Primary Examiner* — David M Brunsman
(74) *Attorney, Agent, or Firm* — Terrence M. Flaherty

(57) ABSTRACT

A method for preparing an MAZ framework type zeolite is disclosed using a trimethylphenylammonium cation as a structure directing agent. The MAZ framework type zeolite, in its as-synthesized form, contains in its intracrystalline pores the trimethylphenylammonium cation. The resultant MAZ framework type zeolite crystals have an average crystallite size of greater than 5 μm.

11 Claims, 2 Drawing Sheets

METHOD FOR MAKING MAZ FRAMEWORK TYPE ZEOLITES

TECHNICAL FIELD

This disclosure relates generally to MAZ framework type zeolites and methods for preparing the same using a trimethylphenylammonium cation as a structure directing agent. The resultant MAZ framework type zeolite crystals have an average crystallite size of greater than 5 μm.

BACKGROUND

Molecular sieves are classified by the Structure Commission of the International Zeolite Association according to the rules of the IUPAC Commission on Zeolite Nomenclature. According to this classification, framework type zeolites and other crystalline microporous molecular sieves, for which a structure has been established, are assigned a three letter code and are described in the "*Atlas of Zeolite Framework Types*," Sixth Revised Edition, Elsevier, 2007.

One known molecular sieve for which a structure has been established is the material designated as MAZ, which is a molecular sieve having a tubular 12-membered ring (12-MR) channel system having a diameter of 7.4 Å. A secondary 8-membered ring (8-MR) channel system having dimensions of 3.4×5.6 Å runs parallel to the 12-MR pore system. Examples of MAZ framework type materials include zeolite omega and ZSM-4. MAZ framework type materials are of interest for application in catalysis, particularly various hydrocarbon conversion reactions such as (hydro)cracking, reforming, isomerization, disproportionation, and alkylation and dealkylation processes.

U.S. Pat. No. 4,241,036 discloses zeolite omega and its synthesis using a tetramethylammonium cation as a structure directing agent.

Great Britain Patent No. 1,117,568 discloses zeolite ZSM-4 and its synthesis in the presence of a tetramethylammonium cation as a structure directing agent.

U.S. Pat. No. 4,021,447 discloses that pyrrolidine and choline salts can be used as structure directing agents in the synthesis of ZSM-4.

U.S. Pat. No. 4,331,643 discloses the synthesis of ZSM-4 using 1,4-diazobicyclo[2.2.2]octane as a structure directing agent.

U.S. Pat. No. 4,377,502 discloses the synthesis of ZSM-4 using various oxygen-containing and oxygen-nitrogen-containing organic compounds as a structure directing agent.

It has now been found that pure phase MAZ framework type zeolites can be prepared using a trimethylphenylammonium cation as a structure directing agent. The resultant MAZ framework type zeolite crystals have an average crystallite size of greater than 5 μm.

SUMMARY

In accordance with the present disclosure, there is provided a method of preparing MAZ framework type zeolites by contacting under crystallization conditions (1) at least one source of silicon; (2) at least one source of aluminum; (3) at least one source of an element selected from Groups 1 and 2 of the Periodic Table; (4) hydroxide ions; and (5) a trimethylphenylammonium cation.

In another aspect, there is provided a process for preparing MAZ framework type zeolites by: (a) preparing a reaction mixture containing (1) at least one source of silicon; (2) at least one source of aluminum; (3) at least one source of an element selected from Groups 1 and 2 of the Periodic Table; (4) hydroxide ions; (5) a trimethylphenylammonium cation; and (6) water; and (b) subjecting the reaction mixture to crystallization conditions sufficient to form crystals of the MAZ framework type zeolite.

In yet another aspect, there is provided an MAZ framework type zeolite having a composition, as-synthesized and in its anhydrous state, in terms of mole ratios, as follows:

|  | Broad | Exemplary |
|---|---|---|
| $SiO_2/Al_2O_3$ | 5 to 10 | 5 to 10 |
| $Q/SiO_2$ | 0.015 to 0.15 | 0.04 to 0.10 |
| $M/SiO_2$ | 0.010 to 0.20 | 0.05 to 0.20 | wherein Q is a trimethylphenylammonium cation; and M is selected from the group consisting of elements from Groups 1 and 2 of the Periodic Table.

DETAILED DESCRIPTION

Introduction

Figure 1:
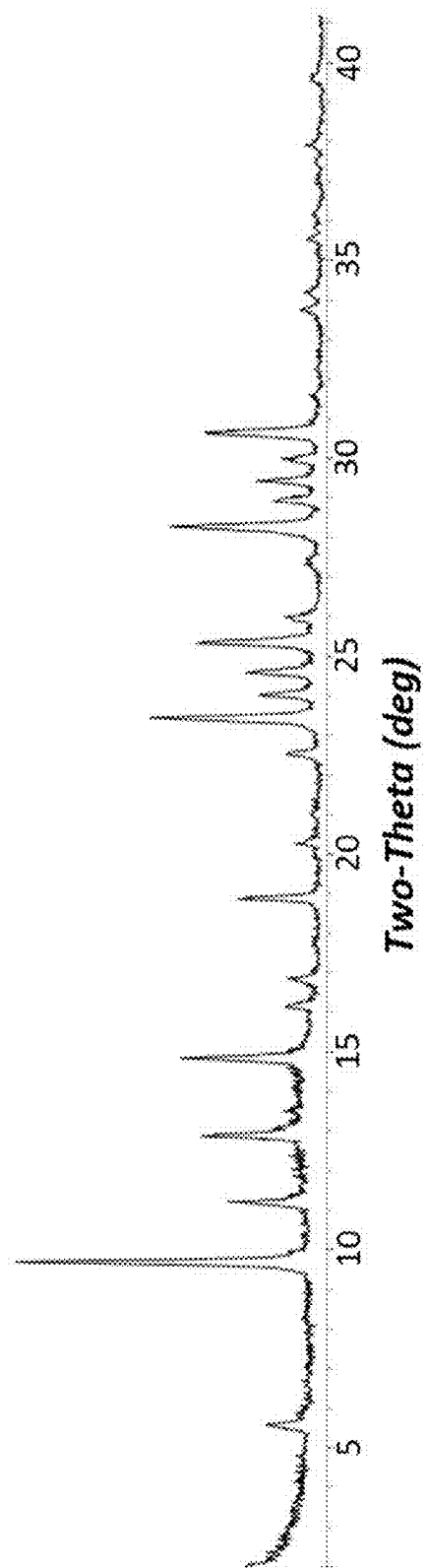
FIG. 1 is a powder X-ray diffraction (XRD) pattern of the as-synthesized zeolite prepared in Example 1.

The following terms will be used throughout the specification and will have the following meanings unless otherwise indicated.

The term "zeolite" refers to crystalline aluminosilicate compositions which are microporous and which are formed from corner sharing $AlO_2$ and $SiO_2$ tetrahedra.

The term "framework type" is used in the sense described in the "*Atlas of Zeolite Framework Types*," Sixth Revised Edition, Elsevier, 2007.

As used herein, the numbering scheme for the Periodic Table Groups is as disclosed in *Chem. Eng. News*, 63(5), 27 (1985).

In preparing MAZ framework type zeolites, a trimethylphenylammonium cation is used as the structure directing agent ("SDA"), also known as a crystallization template. The SDA is represented by the following structure (1):

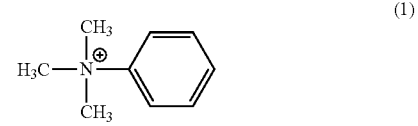

trimethylphenylammonium cation

The SDA dication is associated with anions which can be any anion that is not detrimental to the formation of the molecular sieve. Representative anions include elements from Group 17 of the Periodic Table (e.g., fluoride, chloride, bromide, and iodide), hydroxide, sulfate, tetrafluoroborate, acetate, carboxylate, and the like.

Reaction Mixture

In general, the MAZ framework type zeolite is prepared by: (a) preparing a reaction mixture containing (1) at least one source of silicon; (2) at least one source of aluminum; (3) at least one source of an element selected from Groups 1 and 2 of the Periodic Table; (4) hydroxide ions; (5) a trimethylphenylammonium cation; and (6) water; and (b) subjecting the reaction mixture to crystallization conditions sufficient to form crystals of the MAZ framework zeolite.

The composition of the reaction mixture from which the MAZ framework type zeolite is formed, in terms of mole ratios, is identified in Table 1 below:

TABLE 1

| Components | Broad | Exemplary |
| --- | --- | --- |
| $SiO_2/Al_2O_3$ | 5 to 60 | 5 to 30 |
| $M/SiO_2$ | 0.10 to 1.5 | 0.3 to 1.0 |
| $Q/SiO_2$ | 0.05 to 0.50 | 0.15 to 0.35 |
| $OH/SiO_2$ | 0.10 to 1.5 | 0.30 to 1.0 |
| $H_2O/SiO_2$ | 5 to 100 | 10 to 50 | wherein compositional variables M and Q are as described herein above.

Sources useful herein for silicon include fumed silica, precipitated silicates, silica hydrogel, silicic acid, colloidal silica, tetra-alkyl orthosilicates (e.g., tetraethyl orthosilicate), and silica hydroxides.

Sources useful herein for aluminum include oxides, hydroxides, acetates, oxalates, ammonium salts and sulfates of aluminum. Typical sources of aluminum oxide include aluminates, alumina, and aluminum compounds such as $AlCl_3$, $Al_2(SO_4)_3$, $Al(OH)_3$, kaolin clays, and other zeolites. An example of the source of aluminum oxide is zeolite Y.

As described herein above, for each embodiment described herein, the reaction mixture can be formed using at least one source of an element selected from Groups 1 and 2 of the Periodic Table (referred to herein as M). In one sub-embodiment, the reaction mixture is formed using a source of an element from Group 1 of the Periodic Table. In another sub-embodiment, the reaction mixture is formed using a source of sodium (Na). Any M-containing compound which is not detrimental to the crystallization process is suitable. Sources for such Groups 1 and 2 elements include oxides, hydroxides, nitrates, sulfates, halides, acetates, oxalates and citrates thereof.

For each embodiment described herein, the zeolite reaction mixture can be supplied by more than one source. Also, two or more reaction components can be provided by one source.

The reaction mixture can be prepared either batch wise or continuously. Crystal size, morphology and crystallization time of the zeolite described herein can vary with the nature of the reaction mixture and the crystallization conditions.

Crystallization and Post-Synthesis Treatment

In practice, the MAZ framework type zeolite is synthesized by: (a) preparing a reaction mixture as described herein above; and (b) subjecting the reaction mixture to crystallization conditions sufficient to form crystals of the zeolite. Such conditions are generally known (see, e.g., H. Robson, "*Verified Syntheses of Zeolitic Materials*," Second Revised Edition, Elsevier, 2001).

The reaction mixture is maintained at an elevated temperature until the crystals of the zeolite are formed. The hydrothermal crystallization is usually conducted under pressure and usually in an autoclave so that the reaction mixture is subject to autogenous pressure, at a temperature of from 125° C. to 200° C.

During the hydrothermal crystallization step, the zeolite crystals can be allowed to nucleate spontaneously from the reaction mixture. The use of crystals as seed material can be advantageous in decreasing the time necessary for complete crystallization to occur. In addition, seeding can lead to an increased purity of the product obtained by promoting the nucleation and/or formation of the zeolite over any undesired phases. When used as seeds, seed crystals are added in an amount of from 1 to 10% of the weight of the source for silicon used in the reaction mixture.

Once the zeolite crystals have formed, the solid product is separated from the reaction mixture by standard mechanical techniques such as filtration. The crystals are water-washed and then dried to obtain the as-synthesized zeolite crystals. The drying step can be performed at atmospheric pressure or under vacuum.

The zeolite can be used as-synthesized, but typically will be thermally treated (calcined). The term "as-synthesized" refers to the zeolite in its form after crystallization, prior to the removal of the SDA. The SDA can be removed by thermal treatment (e.g., calcination), preferably in an oxidative atmosphere (e.g., air, gas with an oxygen partial pressure of greater than 0 kPa) at a temperature readily determinable by a skilled artisan sufficient to remove the SDA from the zeolite. The SDA can also be removed by photolysis techniques (e.g., exposing the SDA-containing zeolite product to light or electromagnetic radiation that has a wavelength shorter than visible light under conditions sufficient to selectively remove the organic compound from the zeolite) as described in U.S. Pat. No. 6,960,327.

The zeolite can be subsequently calcined in steam, air or inert gas at temperatures ranging from 200° C. to 800° C. for periods of time ranging from 1 to 48 hours, or more. Usually, it is desirable to remove the extra-framework cation (e.g., $Na^+$) by ion exchange or other known technique and replace it with hydrogen, ammonium, or any desired metal ion.

Characterization of the Zeolite

MAZ framework type zeolites made by the process described herein have a composition, as-synthesized and in the anhydrous state, as described in Table 2 (in terms of mole ratios):

TABLE 2

| | Broad | Exemplary |
| --- | --- | --- |
| $SiO_2/Al_2O_3$ | 5 to 10 | 5 to 10 |
| $Q/SiO_2$ | 0.015 to 0.15 | 0.04 to 0.10 |
| $M/SiO_2$ | 0.010 to 0.20 | 0.05 to 0.20 | wherein compositional variables Q and M are as described herein above.

Typically, the crystallite size of the resultant MAZ framework type zeolite crystals is greater than 5 μm (e.g., at least 7.5 μm, greater than 5 to 15 μm, greater than 5 to 12 μm, from 7.5 to 15 μm, or from 7.5 to 12 μm). As used herein, the term "crystallite size" refers to the longest dimension of the crystal. The average crystallite size can be determined from Scanning Electron Microscopy (SEM) analysis of the zeolite crystallites.

The MAZ framework type zeolites synthesized by the process described herein are characterized by their X-ray diffraction pattern. X-ray diffraction patterns representative of MAZ framework type zeolites can be referenced in the "*Collection of Simulated XRD Powder Patterns for Zeolites*," Fifth Revised Edition, Elsevier, 2007. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can result from variations in the organic compound used in the preparation. Calcination can also cause minor shifts in the X-ray diffraction pattern. Notwithstanding these minor pertubations, the basic crystal structure remains unchanged.

The powder X-ray diffraction patterns presented herein were collected by standard techniques. The radiation was $CuK_\alpha$ radiation. The peak heights and the positions, as a function of 2θ where θ is the Bragg angle, were read from the relative intensities of the peaks, and d, the interplanar spacing corresponding to the recorded lines, can be calculated.

EXAMPLES

The following illustrative examples are intended to be non-limiting.

Example 1

0.34 g of a 50% NaOH solution, 0.28 g of deionized water and 0.50 g of CBV720 Y-zeolite powder (Zeolyst International, $SiO_2/Al_2O_3$ mole ratio=30) were mixed together in a Teflon liner. Then, 1.20 g of 20% trimethylphenylammonium hydroxide was added slowly to the solution. The resulting gel was stirred until homogeneous. The liner was then capped and placed within a Parr steel autoclave reactor. The autoclave was put in an oven heated at 135° C. for 4 days. The solid products were recovered from the cooled reactor by centrifugation, washed with deionized water and dried at 95° C.

Figure 2:
FIG. 2 is a Scanning Electron Micrograph (SEM) image of the as-synthesized zeolite prepared in Example 1.

The resulting zeolite product was analyzed by powder XRD and SEM. The powder XRD pattern shown in FIG. 1 indicates the product is pure MAZ framework type zeolite. The SEM image in FIG. 2 shows a uniform field of crystals having a pillar morphology with typical dimensions of 10×3-4 μm.

The product had a $SiO_2/Al_2O_3$ mole ratio of 8.4, as determined by ICP elemental analysis.

Example 2

0.69 g of a 50% NaOH solution, 1.96 g of deionized water and 1.00 g of CBV720 Y-zeolite powder (Zeolyst International, $SiO_2/Al_2O_3$ mole ratio=30) were mixed together in a Teflon liner. Then, 2.39 g of 20% trimethylphenylammonium hydroxide was added slowly to the solution. The resulting gel was stirred until homogeneous. The liner was then capped and placed within a Parr steel autoclave reactor. The autoclave was put in an oven heated at 135° C. for 4 days. The solid products were recovered from the cooled reactor by centrifugation, washed with deionized water and dried at 95° C.

The resulting zeolite product was identified by powder XRD as pure phase MAZ framework type zeolite.

The product had a $SiO_2/Al_2O_3$ mole ratio of 8.2, as determined by ICP elemental analysis.

Example 3

0.23 g of a 50% NaOH solution, 0.42 g of deionized water and 0.50 g of LZ-210 Y-zeolite powder ($SiO_2/Al_2O_3$ mole ratio=13) were mixed together in a Teflon liner. Then, 0.80 g of 20% trimethylphenylammonium hydroxide was added slowly to the solution. The resulting gel was stirred until homogeneous. The liner was then capped and placed within a Parr steel autoclave reactor. The autoclave was put in an oven heated at 135° C. for 4 days. The solid products were recovered from the cooled reactor by centrifugation, washed with deionized water and dried at 95° C.

The resulting zeolite product was identified by powder XRD as pure phase MAZ framework type zeolite.

The product had a $SiO_2/Al_2O_3$ mole ratio of 8.2, as determined by ICP elemental analysis. SEM images of the product indicated that the crystallite size and morphology were similar to that obtained in Example 1.

Example 4

Example 1 was repeated except that 0.03 g of MAZ seed crystals from a previous synthesis was added to the reaction mixture.

The resulting zeolite product was identified by powder XRD as pure phase MAZ framework type zeolite.

The product had a $SiO_2/Al_2O_3$ mole ratio of 8.9, as determined by ICP elemental analysis.

Example 5

0.37 g of a 50% NaOH solution, 0.26 g of deionized water and 0.50 g of CBV720 Y-zeolite powder (Zeolyst International, $SiO_2/Al_2O_3$ mole ratio=30) were mixed together in a Teflon liner. Then, 1.20 g of 20% trimethylphenylammonium hydroxide was added slowly to the solution. The resulting gel was stirred until homogeneous. The liner was then capped and placed within a Parr steel autoclave reactor. The autoclave was put in an oven heated at 135° C. for 5 days. The solid products were recovered from the cooled reactor by centrifugation, washed with deionized water and dried at 95° C.

The resulting zeolite product was identified by powder XRD as a mixture of MAZ framework type zeolite and a small amount of EON framework type zeolite.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for preparing an MAZ framework type zeolite, comprising:

(a) preparing a reaction mixture containing:
   (1) at least one source of silicon;
   (2) at least one source of aluminum;
   (3) at least one source of an element selected from Groups 1 and 2 of the Periodic Table;
   (4) hydroxide ions;
   (5) a trimethylphenylammonium cation; and
   (6) water; and
(b) subjecting the reaction mixture to crystallization conditions sufficient to form crystals of the MAZ framework type zeolite.

2. The method of claim 1, wherein the zeolite is prepared from a reaction mixture comprising, in terms of mole ratios, the following:

| | |
|---|---|
| $SiO_2/Al_2O_3$ | 5 to 60 |
| $M/SiO_2$ | 0.10 to 1.5 |
| $Q/SiO_2$ | 0.05 to 0.50 |
| $OH/SiO_2$ | 0.10 to 1.5 |
| $H_2O/SiO_2$ | 5 to 100 | wherein M is selected from the group consisting of elements from Groups 1 and 2 of the Periodic Table and Q is a trimethylphenylammonium cation.

3. The method of claim 1, wherein the zeolite is prepared from a reaction comprising, in terms of mole ratios, the following:

| | |
|---|---|
| $SiO_2/Al_2O_3$ | 5 to 30 |
| $M/SiO_2$ | 0.3 to 1.0 |
| $Q/SiO_2$ | 0.15 to 0.35 |
| $OH/SiO_2$ | 0.30 to 1.0 |
| $H_2O/SiO_2$ | 10 to 50 | wherein M is selected from the group consisting of elements from Groups 1 and 2 of the Periodic Table and Q is a trimethylphenylammonium cation.

4. The method of claim 1, wherein the zeolite has a composition, as-synthesized and in its anhydrous state, in terms of mole ratios, as follows:

| | |
|---|---|
| $SiO_2/Al_2O_3$ | 5 to 10 |
| $Q/SiO_2$ | 0.015 to 0.15 |
| $M/SiO_2$ | 0.010 to 0.20 | wherein Q is a trimethylphenylammonium cation and M is selected from the group consisting of elements from Groups 1 and 2 of the Periodic Table.

5. The method of claim 1, wherein the zeolite has a composition, as-synthesized and in its anhydrous state, in terms of mole ratios, as follows:

| | |
|---|---|
| $SiO_2/Al_2O_3$ | 5 to 10 |
| $Q/SiO_2$ | 0.04 to 0.10 |
| $M/SiO_2$ | 0.05 to 0.20 | wherein Q is a trimethylphenylammonium cation and M is selected from the group consisting of elements from Groups 1 and 2 of the Periodic Table.

6. The method of claim 1, wherein the zeolite comprises crystals having an average crystallite size of greater than 5 μm.

7. The method of claim 1, wherein the zeolite comprises crystals having an average crystallite size of from 7.5 to 15 μm.

8. An MAZ framework type zeolite having a composition, as-synthesized and in its anhydrous state, in terms of mole ratios, as follows:

| | |
|---|---|
| $SiO_2/Al_2O_3$ | 5 to 10 |
| $Q/SiO_2$ | 0.015 to 0.15 |
| $M/SiO_2$ | 0.010 to 0.20 | wherein Q is a trimethylphenylammonium cation and M is selected from the group consisting of elements from Groups 1 and 2 of the Periodic Table.

9. The zeolite of claim 8, wherein the zeolite has a composition, as-synthesized and in its anhydrous state, in terms of mole ratios, as follows:

| | |
|---|---|
| $SiO_2/Al_2O_3$ | 5 to 10 |
| $Q/SiO_2$ | 0.04 to 0.10 |
| $M/SiO_2$ | 0.05 to 0.20. |

10. The zeolite of claim 8, wherein the zeolite comprises crystals having an average crystallite size of greater than 5 μm.

11. The zeolite of claim 8, wherein the zeolite comprises crystals having an average crystallite size of from 7.5 to 15 μm.

* * * * *